Jan. 18, 1927. 1,614,867
W. B. BRONANDER
TWO-STROKE CYCLE OPPOSED PISTON INTERNAL COMBUSTION ENGINE
Original Filed Sept. 26, 1919 3 Sheets-Sheet 1
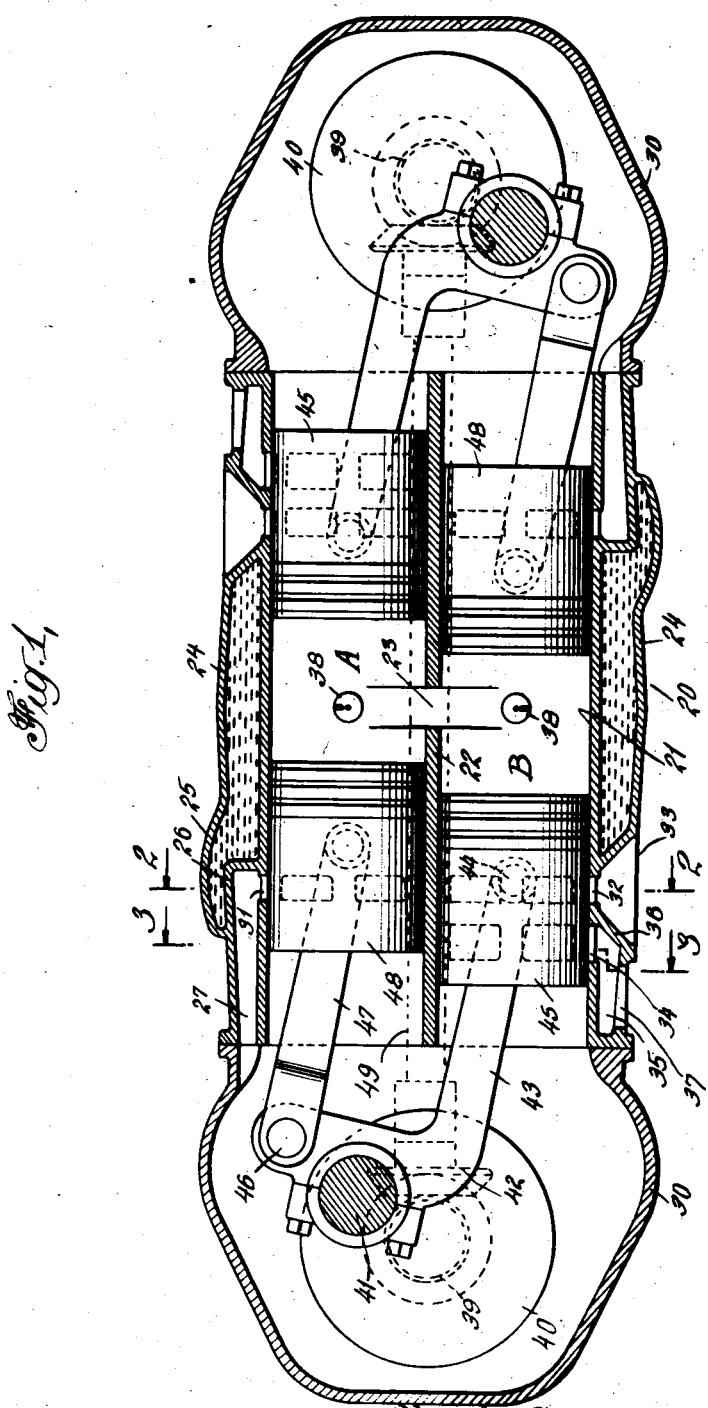
Inventor
W. B. Bronander
By his Attorneys

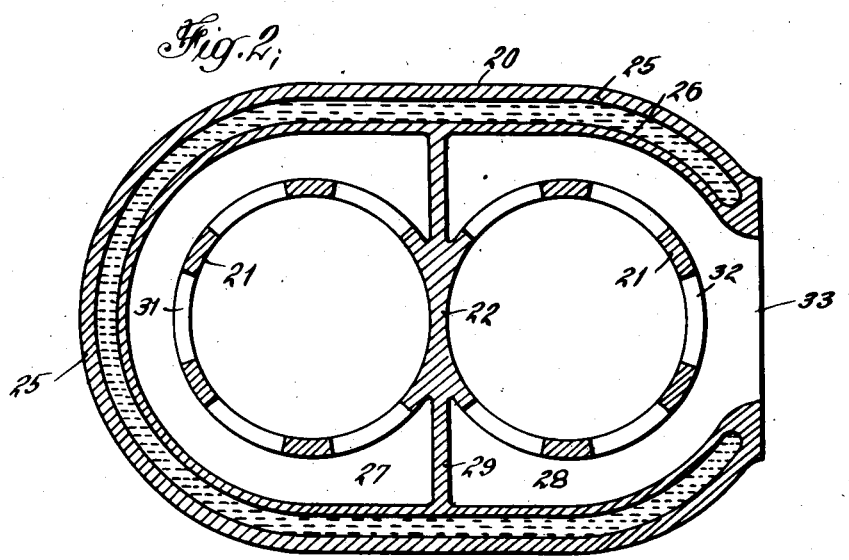
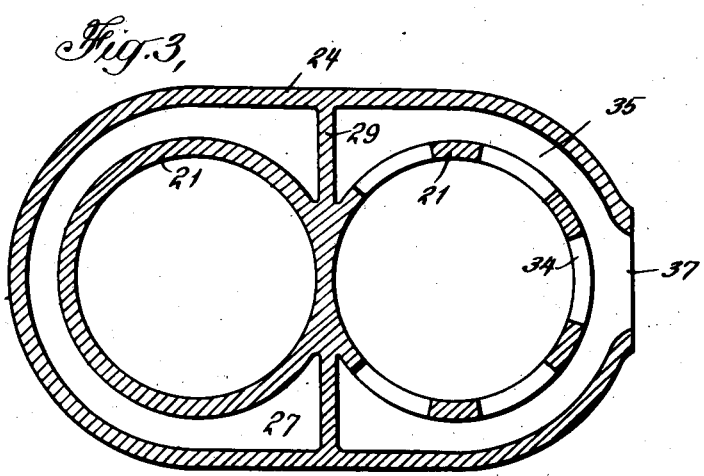

Jan. 18, 1927.
W. B. BRONANDER
1,614,867
TWO-STROKE CYCLE OPPOSED PISTON INTERNAL COMBUSTION ENGINE
Original Filed Sept. 26, 1919   3 Sheets-Sheet 3
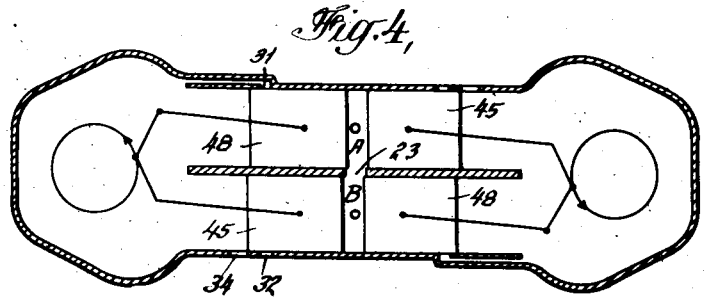
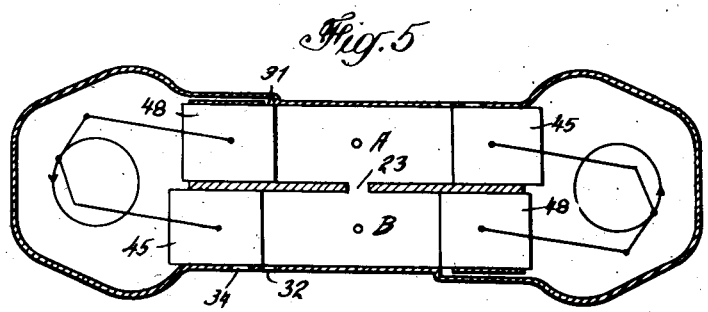
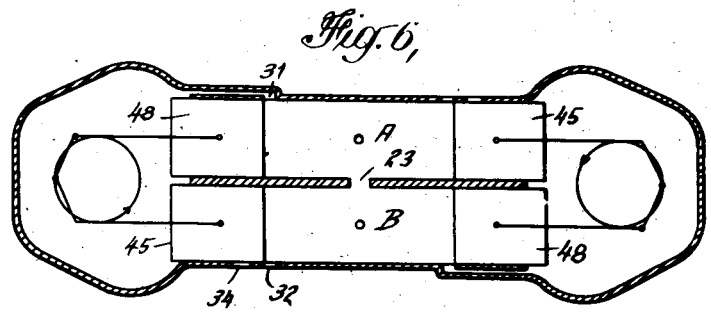
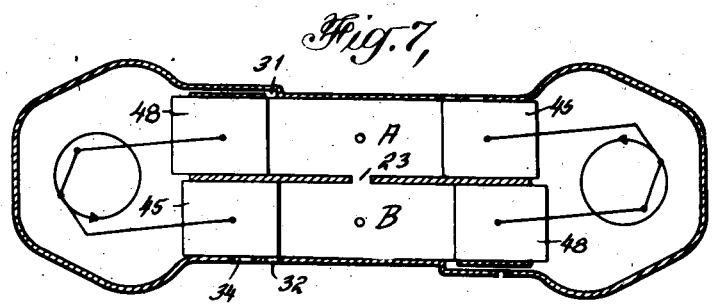
Inventor
W. B. Bronander
By his Attorneys Patented Jan. 18, 1927.

1,614,867

UNITED STATES PATENT OFFICE.

WILHELM BERTIL BRONANDER, OF MONTCLAIR, NEW JERSEY.

TWO-STROKE-CYCLE OPPOSED-PISTON INTERNAL-COMBUSTION ENGINE.

Application filed September 26, 1919, Serial No. 326,589. Renewed June 14, 1926.

This invention relates to improvements in two-stroke-cycle opposed-piston internal combustion engines in which the pistons are utilized for controlling the cylinder ports and the charge of fuel is given a preliminary compression before being introduced into the cylinders between the pistons.

Prior engines, as usually constructed, comprise a number of separate cylinders each provided with inlet ports which are uncovered by the piston as it approaches the bottom of the cylinder to allow a charge of gas, which has been given an initial compression to enter the clyinder. Each cylinder is also provided with exhaust ports which must be so arranged with respect to the inlet ports that they are uncovered before the inlet ports, as the piston approaches the bottom of the cylinder to permit the greater portion of the waste gases to escape before the inlet ports are uncovered. When the inlet ports are uncovered, a charge of gas under pressure will enter the clyinder and aid in sweeping out the waste products, but on account of the arrangement of the inlet and exhaust ports the latter will not be covered until an appreciable time after the inlet ports have been closed by the piston as it moves upward on the next stroke, so that some of the charge may escape from the exhaust ports, the amount depending upon the interval between the closing of the two sets of ports as determined by the speed of the engine.
Due to the escape of more or less of the charge, the advantages of its initial compression are, in a measure, lost and the efficiency of the engine is correspondingly reduced.
Various types of internal combustion engines in which two pistons are arranged in a common cylinder so as to work in opposite directions, have been constructed, the general object of these arrangements being to obtain double the power of a gas engine of the same kind without increasing the diameters of the cylinders and with a lesser number of working parts than would be required were the same increase in power obtained by providing additional separate cylinders with their necessary adjuncts. As these engines have usually been constructed, each power unit comprises a single elongated cylinder having near one end a series of exhaust ports which are controlled by one of the pistons, and near the other end a series of ports through which scavenging air is introduced and beyond these ports a series of inlet ports through which the fuel charge is supplied, both of these series of ports being controlled by the other piston. Two-stroke-cycle engines of this general construction are open to the same objections as are the types of two-stroke-cycle engines described above in which a single piston controls both the exhaust and inlet ports in the same clyinder, namely, that the exhaust ports must be arranged to be uncovered by one of the pistons before the inlet ports are uncovered by the other piston to permit the waste gases to escape as the pistons move apart during their working stroke, and since the exhaust ports are uncovered before the inlet ports, they will remain open after the inlet ports have been closed during the opposite or compression stroke of the pistons. There is, accordingly, a possibility that some of the charge supplied to the cylinder will escape through the exhaust ports, and the slower the speed of the engine the greater will be the amount of charge that may escape. As in the case of single piston engines, the advantage of the initial compression of the fuel is thus in a measure lost, and the efficiency of the engine is correspondingly reduced.

Various attempts have been made to overcome this defect in engines of this type, such at throttling devices or valves adapted to be operated in such a manner as to permit a free discharge of the products of combustion during the earlier part of the exhaust period and to check the exhaust outlet to allow the building up of pressure of the incoming charge so that the advantages of the initial compression of the charge are retained. Such arrangements, however, require the provision of relatively complicated valves which must be operated in timed relation to the other parts of the engine and are in addition usually made responsive to the load on the engine, as by being controlled by a governor so as to vary the throttling effect in accordance with the demands upon the engine.

It is an object of this invention to provide a two-stroke-cycle, opposed-piston internal combustion engine in which the disadvantages of engines of this type as usually constructed are overcome.

In accordance with the present invention, each power unit of the engine comprises a pair of elongated, parallel cylinders which are in communication with each other at a point midway between their ends and in each of which is a pair of pistons adapted to move in opposite directions. The ends of these cylinders are in communication with gastight crank cases in which the preliminary compression of the fuel charge takes place and which are adapted to be placed in communication with the cylinders through two series of inlet ports in the walls of the cylinders, which are controlled by two of the four pistons of the unit. The charges of fuel are admitted to the crank cases through supply ports in the walls of the cylinders, which are uncovered by the other two pistons when they are at the inner ends of their strokes. Adjacent the supply ports, but nearer the center of the cylinders are exhaust ports which are uncovered by the same pistons that control the supply ports, when these pistons are at the outer ends of their strokes.

It is also characteristic of the invention that the pistons are connected in pairs to two crank shafts of the engine in such a manner that as they move outwardly on the working stroke the two pistons that control the exhaust ports will uncover these ports before the two pistons that control the inlet ports have uncovered the latter ports, and on the reverse or compression stroke the pistons controlling the exhaust ports will again travel in advance of the other pistons so as to cover the exhaust ports before the latter pistons have covered the inlet ports. There is, accordingly, an interval during which all of the exhaust and inlet ports are simultaneously opened so that the charges of compressed gas which are permitted to enter the cylinders will sweep out such waste gases as did not escape when the exhaust ports were first uncovered. The gases will rush through the cylinders and through the opening between them and effectively scavenge all parts of the same. Since the exhaust ports are always closed before the inlet ports there is no diminution of pressure, and the compression under which the gas is supplied to the spaces between the pistons is maintained. The arrangement possesses the further advantage that it avoids the use of all projections or baffles such as are frequently provided at the tops of pistons in engines of the two-stroke-cycle type in which each piston controls inlet and exhaust ports in the walls of the same cylinder, and which tend to cause the formation of pockets of gas. Furthermore, the manner in which the pistons are connected to the crank shafts permits a longer stroke with the same throw of the cranks than could be obtained by a single piston connected to a crank shaft in the usual manner.

In the particular embodiment of the invention disclosed in this application one series of inlet ports is arranged in the wall of one of the cylinders toward the end of the cylinder that communicates with one of the crank cases while the other series of inlet ports is correspondingly arranged in the wall of the other cylinder toward the end that communicates with the other crank case. The two series of carburetor and exhaust ports are arranged at the ends of the cylinders opposite to those at which the inlet ports are placed. It will be understood, however, that the two series of inlet ports may be arranged toward opposite ends of one cylinder, while the carburetor and exhaust ports of the unit will be arranged toward opposite ends of the other cylinder, and in a companion application, Serial No. 326,590, filed of even date herewith, which since issued as Patent No. 1,432,320 on October 17, 1922, I have shown, described and claimed such a modification of the invention.

The particular nature of the invention, as well as other objects and advantages thereof, will appear more clearly from a description of a preferred embodiment as shown in the accompanying drawings in which:—

Fig. 1 is a longitudinal section through one of the power units of the engine at right angles to the crank shafts;

Fig. 2 is a transverse section of the unit along the line 2—2 of Fig. 1.

Fig. 3 is a similar section along the line 3—3 of Fig. 1; and

Figs. 4 to 7, inclusive, are diagrams showing successive positions of the moving parts of the engine.

It will be understood that the engine may be composed of as many units as desired, but since these units are all of the same construction only one of them has been shown in the drawings and will be described in the following specification. In the drawings, in which similar reference characters denote similar parts throughout the several views, 20 is a casing provided with a pair of circular inner walls 21 which merge together as at 22, thus forming a pair of elongated, adjacent, parallel cylinders A and B separated by a center wall which, at a point midway between the ends of the cylinders, is provided with an aperture 23 to permit communication between the cylinders. The casing 20 is provided with an outer wall 24 which forms in connection with the cylinder walls a chamber through which a cooling liquid may be circulated by means of suitable pipe connections. At each end of the casing the wall 24 is carried outwardly as at 25, and the ends of the chamber are formed by partitions 26, so that there is thus formed in each end of the casing a space which is divided into two chambers 27 and 28 by a partition 29 extending from the wall 22 between the cylinders to the outer wall 24 and the corresponding partition 26 as shown most clearly in Figs. 2 and 3. The outer ends of the chambers 27 are in communication with the interiors of gas-tight crank cases 30 attached to the ends of the casing in any suitable manner. The inner end of one of the chambers 27 is in communication with cylinder A through a number of inlet ports 31, while the inner end of the other chamber 27 is in communication with cylinder B through similar inlet ports. Each of the two chambers 28 communicates with one of the cylinders through exhaust ports 32, and at the sides of the casing the chambers are provided with enlarged ports 33 to which exhaust manifolds may be connected, it being understood that the manifolds of each unit may merge into a common manifold to which the manifolds of the other units of the engine may also be connected. Between the exhaust ports 32 and the ends of the cylinders are supply ports 34 which communicate with chambers 35 formed between the wall of each of the cylinders and the outer wall of casing 20 and each separated from the adjacent chamber 28 by a partition 36. Each of the chambers 35 is provided with an enlarged port 37 adapted to be connected to a gas-supply manifold, and as in the case of the exhaust manifolds, the supply manifolds of each unit may merge into a common manifold leading to a carburetor. The heat transmitted through the partitions 36 from the exhaust gases discharged through the ports 32 will raise the temperature of the incoming fuel charges. Each of the cylinders is provided at a point midway between its ends with a suitable spark plug 38 for igniting the charge within the cylinder.

Mounted in suitable bearings at opposite ends of the unit are shafts 39, it being understood that these shafts are common to the several units of which the engine is composed and each is provided at the points where it passes through the walls of the crank cases with suitable bushings to prevent escape of gas from the crank cases. Each of the shafts 39 is provided with cranks 40 for each unit of the engine, and each crank has a pin 41 upon which is journaled a member 42 having extended ends to one of which is rigidly attached, as by being formed integrally therewith, a connecting rod 43 which is pivotally attached as at 44 to one of the pistons 45 of one cylinder. Attached to the other extended end of member 42, as by means of a journal 46, is the forked end of a connecting rod 47 which is pivotally attached to the companion piston 48 of the other cylinder. It is necessary to provide a pivotal connection between one of the connecting rods and the member 42 attached to the crank pin to allow for slight variations in the parallelism of the two connecting rods which occur during the movement of the parts.

It is necessary that the two main shafts be connected to each other in order that the correct operative relation between both pairs of pistons shall be maintained. As indicated on the drawings this connection comprises a transverse shaft 49 geared to each of the main shafts 39 by suitable bevel or other gears, but it will be understood that any other suitable arrangement may be employed for connecting the main shafts to each other.

It will be seen from the above description of the apparatus that there is provided a twin-cylinder opposed-piston power unit, in which the halves of the unit are of similar construction, and the corresponding ports and pistons are so arranged that one piston of each cylinder controls the inlet ports 31 of the cylinder, and the other piston controls the exhaust ports 32 and the carburetor or supply ports 34 of the same cylinder, while both pairs of companion pistons are connected to the crank shafts in the manner shown.

The operation of the engine can be explained most clearly by the aid of the diagrams of Figs. 4 to 7, inclusive. Assuming that both of the crank pins of the unit are at their inner dead centers, each pair of companion pistons will be at the inner limits of their strokes and their faces will be in the same plane. The two crank shafts are assumed to be rotating in the directions indicated by the arrows in Figs. 4 to 7, inclusive. As the crank pins of both pairs of pistons move away from their dead center points, each of the pistons 45 will move outwardly a slight amount, while the companion pistons 48 continue to move inwardly, and Fig. 4 shows the positions of the pistons at this stage of operation. In any internal combustion engine the explosion should take place when the gas is under greatest compression, as it is when the piston is at the limit of its inward stroke, but at this time the crank to which the piston is connected will be on dead center and some power will be lost if the charge is then fired. It is of advantage to have the explosion occur immediately after the crank has passed over the dead center, but there will then be a loss in the compression of the charge due to the increased space in the cylinder. With the present arrangement ignition may take place after the cranks have passed their dead centers, for the slight outward movement of pistons 45 is compensated by a corresponding inward movement of pistons 48 so that the charge of gas between the opposed pistons is kept under maximum compression at the instant of firing, there being communication between the two cylinders through aperture 23 so that any differences in pressure are equalized.

During the working stroke both pistons 45 move outwardly more rapidly than do the pistons 48 so that during this stage of operation each pair of companion pistons has the general relation shown in Fig. 1. When the pistons 45 are at the inner ends of their strokes, both sets of carburetor ports 34 will be uncovered to permit a fuel charge to pass into each crank case. As each piston 45 moves outwardly it covers the corresponding ports 34, and since the inlet ports 31 are covered by the pistons 48, the charges in the crank cases of the unit will be compressed by the pistons. Each piston 45 will continue to travel in advance of its companion piston 48 and will finally reach the position shown in Fig. 5 where the exhaust ports 32 will be uncovered to permit the waste gases to escape from the cylinders. Shortly thereafter the pistons 48 will, as shown in Fig. 6, reach a position where the inlet ports 31 will be uncovered, so that the fuel charges which are under compression in the crank cases, may enter the cylinders. As the exhaust ports 32 at the other end of each cylinder are also open, the advance of the charges through the cylinders will sweep out any waste gases that have not already escaped through the exhaust ports. While this scavenging operation is occurring, the cranks are passing over their lower dead centers and the pistons occupy the positions shown in Fig. 6.

On account of the arrangement by which the pistons are connected to the crank shafts, pistons 45 will then move inwardly ahead of their companion pistons 48 to close the exhaust ports 32 while the inlet ports 31 are still open, as indicated in Fig. 7. The moving parts of the unit should be so timed that both sets of exhaust ports 32 will be covered just before the incoming charges reach these ports during their progress through the cylinders. Due to the lag of pistons 48 behind pistons 45 during their inward movement, the inlet ports 31 will remain open a sufficient interval of time after the exhaust ports 32 have been closed to permit a full charge to be supplied to both of the cylinders. The pistons 48 will finally cover the inlet ports 31, and thereafter the pistons move inwardly on the compression stroke, pass over their inner dead center points and reach the position indicated in Fig. 4 where the charges in the cylinders will be ignited. The inward movement of the pistons will create a vacuum in each of the crank cases so that when the pistons 45 have uncovered the carburetor ports 34 a charge of gas will rush into each crank case from the carburetor to be compressed on the next stroke of the pistons.

From the above description it will be seen that the invention provides a two-stroke-cycle, opposed-piston engine in which all of the exhaust ports are opened ahead of the inlet ports on the working strokes and closed ahead of the inlet ports on the compression strokes so that pressures higher than that of the atmosphere may be obtained in the cylinders before the compression strokes begin, there being no loss of compression as in the case of the usual types of engines in which the exhaust ports cannot be closed until after the inlet ports have been closed on account of the construction of the engines.

The arrangement also provides for the most effective scavenging of the cylinders for the incoming charges of compressed gas will rush through each cylinder and may also pass from one cylinder into the other, with the result that all of the residues of combustion that did not escape when the exhaust ports were first uncovered will be swept out of the cylinders. This improved scavenging effect is obtained without the use of baffles or other projecting members upon the pistons, so that there are no pockets in which waste gases may collect, and it is not necessary to provide any superfluous space between the inner ends of the pistons to take care of such projecting members. The arrangement by which the pistons are connected to the cranks of the engine also permits them to have a longer stroke than would be obtained by a single piston connected to a crank of the same radius.

While only one unit has been shown and described above, it will be understood that a complete engine will comprise a number of such units which may be connected to the crank shafts in such angular relations as will produce the most effective operation. In the embodiment of the invention herein shown, the two crank shafts rotate in the same direction, but by the provision of suitable gearing in connection with one of the shafts, the members driven by the shafts may be rotated in opposite directions. But by employing the arrangement shown in my companion application, Serial No. 326,590, filed concurrently herewith, no such gearing is necessary as the two crank shafts rotate in opposite directions. While the invention has been illustrated in connection with an engine that is fired from a spark plug, it should also be understood that the invention is applicable to the Diesel type of engine, in which a heavy oil is injected directly into the combustion chamber. It will also be understood that various other changes in the details of construction of the apparatus may be made without departing from the principle of the invention as defined in the appended claims.

I claim:

1. An internal combustion engine, comprising a pair of communicating parallel cylinders, an inlet port in the wall of one cylinder toward one end thereof, an exhaust port in the wall of the same cylinder toward the other end thereof, an inlet port in the wall of the second cylinder toward the end thereof opposite to the end of the first cylinder at which the inlet port therein is located, an exhaust port in the wall of the second cylinder at the end thereof opposite to the end at which the inlet port is located, a piston in each cylinder for controlling the inlet port therein, a piston in each cylinder for controlling the exhaust port therein, power transmitting means comprising two crank shafts geared together for simultaneous movement adjacent the ends of the cylinders, and connections between each power transmitting means and the adjacent pistons of the two cylinders arranged to cause each inlet port controlling piston to lag behind its companion exhaust port controlling piston during each stroke of the pistons.

2. An internal combustion engine, comprising a pair of communicating parallel cylinders open at their ends, crank shafts geared together for simultaneous movement adjacent the ends of the cylinders, a gas-tight casing surrounding each shaft and communicating with the corresponding open ends of the cylinders, inlet ports in the walls of the cylinders communicating with the interiors of the crank cases, adjacent exhaust and gas supply ports in the walls of respective cylinders, opposed pistons in each cylinder adapted to control the ports therein, and connections between the pistons and the crank shafts arranged to cause the pistons controlling the supply and exhaust ports to uncover the supply ports when they are at the inner limits of their strokes and to uncover the exhaust ports before the pistons controlling the inlet ports have uncovered their ports during the working strokes and to cover the exhaust ports before the other pistons cover the inlet ports during the compression strokes.

3. An internal combustion engine, comprising a pair of parallel communicating cylinders open at their ends, crank shafts connected together for simultaneous movement adjacent the ends of the cylinders, a gas-tight casing surrounding each crank shaft and communicating with the corresponding ends of the cylinders, inlet ports in the wall of each cylinder communicating with the respective crank cases through passageways in the walls of the cylinders, a piston in each cylinder for controlling the inlet ports therein, exhaust ports in the wall of each cylinder, a piston in each cylinder for controlling the exhaust ports therein, fuel supply ports in the wall of each cylinder located between the exhaust ports and the end of the cylinder and adapted to be placed in communication with the corresponding crank case when the exhaust port controlling piston of the cylinder is at the inner limit of its stroke, and connections between the pistons and the crank shafts arranged to cause each piston controlling the inlet ports to lag behind the companion piston controlling the exhaust ports during each stroke of the pistons so that the exhaust ports are opened ahead of the inlet ports during the working strokes and closed ahead of the inlet ports during the reverse strokes.

4. An internal combustion engine comprising a pair of parallel cylinders, an inlet port toward one end of the first cylinder and an exhaust port toward the other end of the same cylinder, inlet and exhaust ports in the second cylinder opposite the exhaust and inlet ports in the first cylinder, oppositely movable port controlling pistons in said cylinders, a pair of crank shafts at the opposite ends of the cylinders, connections between one of the crank shafts and the inlet port controlling piston of the first cylinder and the exhaust port controlling piston of the second cylinder and connections between the other crank shaft and the exhaust port controlling piston of the first cylinder and the inlet port controlling piston of the second cylinder arranged to cause the inlet port controlling pistons to lag behind the exhaust port controlling pistons.

5. An internal combustion engine comprising a pair of parallel cylinders, an inlet port toward one end of the first cylinder and an exhaust port toward the other end of the same cylinder, inlet and exhaust ports in the second cylinder opposite the exhaust and inlet ports in the first cylinder, oppositely movable port controlling pistons in said cylinders, a pair of crank shafts at the opposite ends of the cylinders connected together for simultaneous movement, connections between one of the crank shafts and the inlet port controlling piston of the first cylinder and the exhaust port controlling piston of the second cylinder and connections between the other crank shaft and the exhaust port controlling piston of the first cylinder and the inlet port controlling piston of the second cylinder arranged to cause the inlet port controlling pistons to lag behind the exhaust port controlling pistons.

6. An internal combustion engine comprising a pair of parallel cylinders open at their ends, a pair of crank shafts adjacent the ends of the cylinders, a gas tight casing surrounding each crank shaft and communicating with the corresponding ends of the cylinders, an inlet port toward one end of the first cylinder communicating with its respective crank case and an exhaust port toward the other end of the first cylinder, inlet and exhaust ports in the second cylinder opposite the exhaust and inlet ports in the first cylinder, said inlet port in the second cylinder being in communication with the other crank case, a supply port in each cylinder between its exhaust port and the end of the cylinder and oppositely movable port controlling pistons in each cylinder, connections between one of the crank shafts and the inlet port controlling piston of the first cylinder and the exhaust port controlling piston of the second cylinder and connections between the other crank shaft and the exhaust port controlling piston of the first cylinder and the inlet port controlling piston of the second cylinder arranged to cause the inlet port controlling pistons to lag behind the exhaust port controlling pistons, the exhaust port controlling cylinders being arranged to open communication between the supply ports and the respective crank cases.

7. An internal combustion engine comprising a pair of parallel cylinders open at their ends, a pair of crank shafts adjacent the ends of the cylinders connected together for simultaneous movement, a gas tight casing surrounding each crank shaft and communicating with the corresponding ends of the cylinders, an inlet port toward one end of the first cylinder communicating with its respective crank case and an exhaust port toward the other end of the first cylinder, inlet and exhaust ports in the second cylinder opposite the exhaust an inlet ports in the first cylinder, said inlet port in the second cylinder being in communication with the other crank case, a supply port in each cylinder between its exhaust port and the end of the cylinder, and oppositely movable port controlling pistons in each cylinder, connections between one of the crank shafts and the inlet port controlling piston of the first cylinder and the exhaust port controlling piston of the second cylinder and connections between the other crank shaft and the exhaust port controlling piston of the first cylinder and the inlet port controlling piston of the second cylinder arranged to cause the inlet port controlling pistons to lag behind the exhaust port controlling pistons, the exhaust port controlling pistons being arranged to open communication between the supply ports and the respective crank cases.

In testimony whereof I affix my signature.

WILHELM BERTIL BRONANDER.